(12) United States Patent
Park et al.

(10) Patent No.: US 12,026,101 B2
(45) Date of Patent: Jul. 2, 2024

(54) METHODS OF OPERATING HOST DEVICE AND STORAGE DEVICE, AND ELECTRONIC DEVICE

(71) Applicant: SAMSUNG ELECTRONICS CO., LTD., Suwon-si (KR)

(72) Inventors: Daejun Park, Suwon-si (KR); Keoseong Park, Suwon-si (KR)

(73) Assignee: SAMSUNG ELECTRONICS CO., LTD., Suwon-si Gyeonggi-do (KR)

( * ) Notice: Subject to any disclaimer, the term of this patent is extended or adjusted under 35 U.S.C. 154(b) by 3 days.

(21) Appl. No.: 17/958,604

(22) Filed: Oct. 3, 2022

(65) Prior Publication Data

US 2023/0195648 A1 Jun. 22, 2023

(30) Foreign Application Priority Data

Dec. 17, 2021 (KR) ........................ 10-2021-0181311

(51) Int. Cl.
*G06F 12/1027* (2016.01)
(52) U.S. Cl.
CPC ...... *G06F 12/1027* (2013.01); *G06F 2212/68* (2013.01)
(58) Field of Classification Search
None
See application file for complete search history.

(56) References Cited

U.S. PATENT DOCUMENTS

| | | |
|---|---|---|
| 10,558,393 B2 | 2/2020 | Shin et al. |
| 10,923,202 B2 | 2/2021 | Palmer |
| 2019/0004944 A1* | 1/2019 | Widder ............... G06F 12/0246 |
| 2020/0133571 A1 | 4/2020 | Kim et al. |
| 2020/0250104 A1* | 8/2020 | Byun ..................... G06F 12/10 |
| 2020/0387445 A1 | 12/2020 | Byun |
| 2020/0394139 A1 | 12/2020 | Lee et al. |
| 2021/0034536 A1 | 2/2021 | Kim et al. |
| 2021/0133095 A1 | 5/2021 | Kim et al. |
| 2021/0216458 A1 | 7/2021 | Kang et al. |
| 2021/0263852 A1 | 8/2021 | Seok et al. |

FOREIGN PATENT DOCUMENTS

KR 10-2020-0143871 A 12/2020

\* cited by examiner

*Primary Examiner* — Charles J Choi
(74) *Attorney, Agent, or Firm* — Muir Patent Law, PLLC

(57) ABSTRACT

A method of operating a host device includes monitoring execution of a command sequence corresponding to a specific situation, determining whether working file set information for the command sequence is present in a database, transferring a logical address corresponding to the working file set information to a device driver driving a storage device when the working file set information is present in the database, requesting map information corresponding to the logical address from the storage device, receiving the map information from the storage device, and storing the map information in a buffer memory.

20 Claims, 10 Drawing Sheets

METHODS OF OPERATING HOST DEVICE AND STORAGE DEVICE, AND ELECTRONIC DEVICE

CROSS-REFERENCE TO RELATED APPLICATION(S)

This application claims the benefit under 35 U.S.C. 119(a) of Korean Patent Application No. 10-2021-0181311, filed on Dec. 17, 2021, in the Korean Intellectual Property Office, the entire disclosure of which is incorporated herein by reference for all purposes.

BACKGROUND

1. Field

Embodiments relate to a method of operating a host device, a method of operating a storage device, and an electronic device.

2. Description of the Related Art

In general, host systems include host devices and storage devices. A storage device includes a memory controller and a memory device. Within a host system, a host device and a storage device are connected to each other through various interface standards such as Universal Flash Storage (UFS), Serial Advanced Technology Attachment (SATA), Small Computer Small Interface (SCSI), Serial Attached SCSI (SAS), embedded Multi Media Card (eMMC), and the like. The host device includes a host memory therein separately from the storage device.

SUMMARY

According to example embodiments, a method of operating a host device includes monitoring execution of a command sequence corresponding to a specific situation; determining whether working file set information for the command sequence is present in a database; transferring a logical address corresponding to the working file set information to a device driver driving a storage device when the working file set information is present in the database; requesting map information corresponding to the logical address from the storage device; receiving the map information from the storage device; and storing the map information in a buffer memory.

According to example embodiments, a method of operating a storage device includes setting a host performance booster mode; receiving hint information having a request for map information, from a host device; selecting the map information based on the hint information; transmitting the selected map information to the host device; and receiving a read request from the host device. The read request includes a read command, a logical address, and a physical address corresponding to the map information.

According to example embodiments, an electronic device includes an application processor configured to monitor a process and a file access to identify a specific context, predict a read operation in a specific range corresponding to the specific context, and output hint information corresponding to the read operation; a storage device caching Logical-to-Physical (L2P) map information to the application processor, based on the hint information; a buffer memory configured to store the L2P map by the application processor; and a display device displaying data processed by the application processor. The application processor transmits a read request to the storage device, using the L2P map stored in the buffer memory.

BRIEF DESCRIPTION OF DRAWINGS

Features will become apparent to those of skill in the art by describing in detail example embodiments with reference to the attached drawings in which.

DETAILED DESCRIPTION

A host memory may be used as a cache memory of a storage device. In general, a host performance booster (HPB) is a technique of caching a logical-to-physical (L2P) map of Universal Flash Storage (UFS) in a host. A detailed description of HPB will be provided herein in combination with descriptions set forth in U.S. Patent Application Publication No. 2020/0133571 A1 (Kim, Dong-Woo, et al.) and U.S. Patent Application Publication No. 2020/0394139 A1 (Lee, Man-Jong, et al.), which were filed by Samsung Electronics Co., Ltd.

U.S. Patent Application Publication No. 2020/0133571 A1 and U.S. Patent Application Publication No. 2020/0394139 A1 are hereby incorporated by reference in this application, in their entireties.

The HPB function is implemented in a device control mode (DCM) or a host control mode (HCM). In the device control mode (DCM), the device sends a hint for the map to the host. In the host control mode (HCM), the host assigns a specific map directly to the device.

In general, when a large number of map misses occur due to input/output requests generated by the host, the device loads the relevant map. If a map for a completed range that is no longer needed by the host is loaded from the device, the map becomes meaningless information, and as a result, does not help to improve read performance.

In a host system and an operating method thereof according to an example embodiment, a specific situation (or context) is determined in the host to bring the map information proactively by the host, and a map for a file suitable for the specific situation is pre-fetched, thereby improving the read performance of the working file set.

Figure 1:
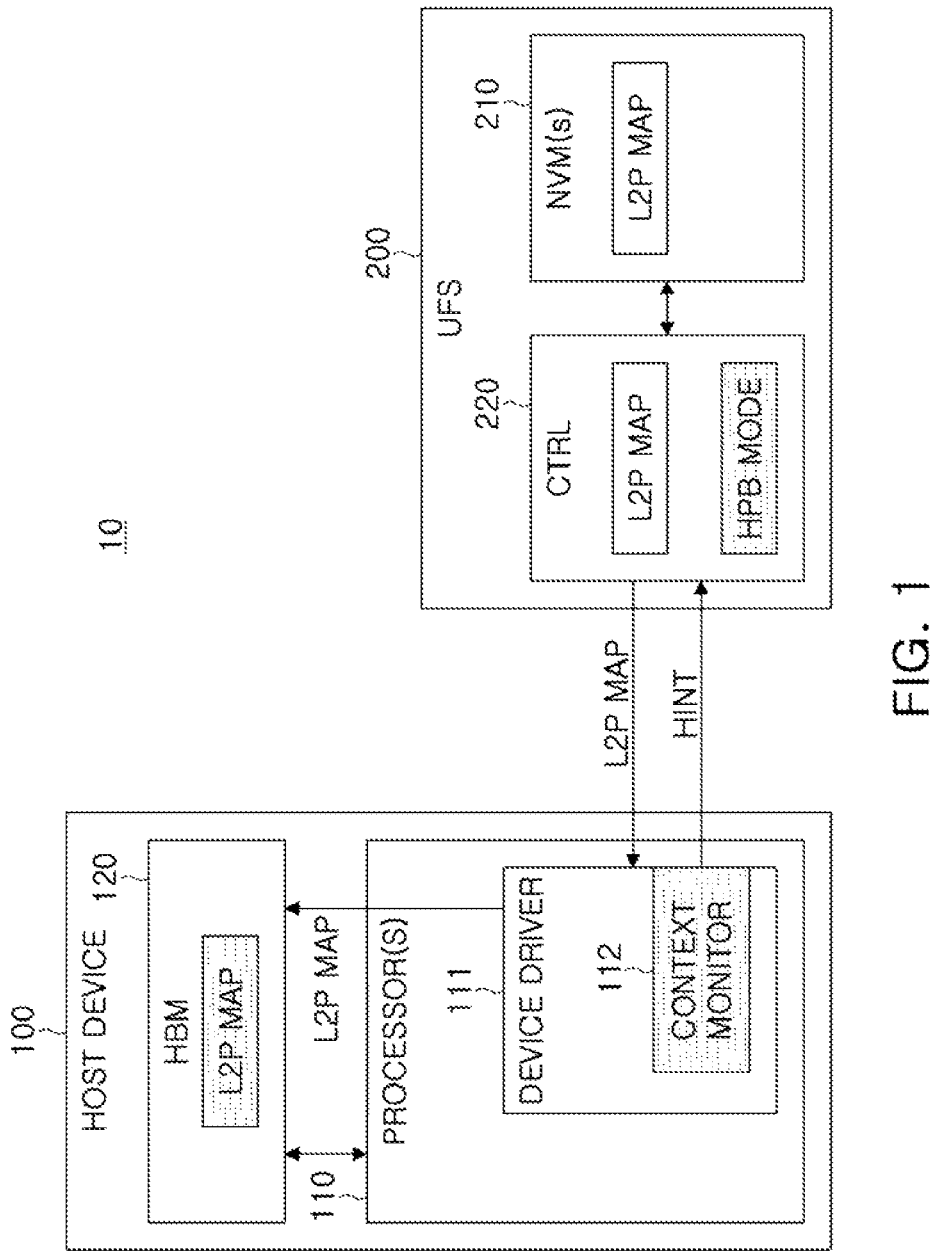
FIG. 1 is a diagram illustrating, by way of example, a host system 10 according to an example embodiment.

FIG. 1 is a diagram illustrating, by way of example, a host system 10 according to an example embodiment.

Referring to FIG. 1, the host system 10 may include a host device 100 and a storage device (UFS, 200).

The host device 100 may include at least one processor 110 and host buffer memory (HBM, 120).

The processor 110 may be implemented to control the overall operation of the host device 100. The processor 110 may be a central processing unit (CPU), an application processor, a modem integrated application processor, a SoC, an integrated circuit, or the like. The processor 110 may be implemented to execute an operating system. The operating system may include a file system for file management. For example, the file system may include any one of various file systems such as File Allocation Table (FAT), FAT32, NT File System (NTFS), Hierarchical File System (HIFS), Journaled File System2 (JSF2), XFS, On-Disk Structure-5 (ODS-5), UDF, ZFS, Unix File System (UFS), ext2, ext3, ext4, ReiserFS, Reiser4, ISO 9660, Gnome VFS, BFS, or WinFS.

The processor 110 may be implemented to drive a device driver 111. The device driver 111 may be software for controlling a peripheral device, such as the storage device 200, at the operating system level.

The device driver 111 may include a context monitor 112. The context monitor 112 may be implemented to monitor a specific situation with respect to open file information, for example, a working file set, and output hint information according to a monitoring result. The hint information may include request information for caching an L2P map corresponding to a specific situation in the HPB mode. In an example embodiment, the specific situation refers to an action in which a specific process opens/accesses a specific file. For example, a specific situation could be the action of a gallery process opening an image file, in which case the working file set may be image files to be used by the gallery process.

In an example embodiment, the device driver 111 may monitor process and file access to identify a specific context, learn a read operation in a specific range corresponding to the specific context, and output hint information corresponding to the read operation. The learning may use machine learning. In another example embodiment, the device driver 111 may monitor a process and file access to identify a specific context, heuristically determine a read operation in a specific range corresponding to the specific context, and output a hint corresponding to the read operation.

Also, the device driver 111 may request an input/output operation for the storage device 200 using the L2P map stored in the host buffer memory 120. For example, the device driver 111 may add a physical address as well as a logical address to the input/output request by using the L2P map. Using the added physical address, the storage device 200 may directly access a non-volatile memory device 210 without a separate address translation operation.

The host buffer memory 120 may be implemented to temporarily store data used for the operation of the host device 100. The host buffer memory 120 may be implemented as a volatile memory such as static random access memory (SRAM), dynamic RAM (DRAM), synchronous RAM (SDRAM), or the like, or as a non-volatile memory such as a phase-change RAM (PRAM) or magneto-resistive RAM (MRAM)), Resistive RAM (ReRAM), Ferroelectric RAM (FRAM), or the like.

The host buffer memory 120 may store an L2P map related to the storage device 200. In an example embodiment, the host buffer memory 120 may store metadata used for managing the storage device 200. In an example embodiment, the metadata may be data encrypted using a key shared with the storage device 200.

The storage device 200 may include at least one non-volatile memory device (NVM(s)) 210 and a controller (CTRL) 220.

The non-volatile memory device (NVM(s)) 210 may be a NAND flash memory, a vertical NAND flash memory (VNAND), a NOR flash memory, a resistive random access memory (RRAM), a Phase-Change Memory (PRAM), a Magnetoresistive Random Access Memory (MRAM), a Ferroelectric Random Access Memory (FRAM), a Spin Transfer Torque Random Access Memory (STT-RAM), or the like.

The non-volatile memory device 210 may include a plurality of memory blocks having a plurality of memory cells connected to word lines and bit lines. Each of the plurality of memory cells may store at least one bit.

The non-volatile memory device 210 may store metadata used to manage the storage device 200. For example, the non-volatile memory device 210 may store an L2P map.

The controller 220 may be implemented to control the non-volatile memory device 210. For example, the controller 220 may receive an input/output request (a read request or a write request) from the host device 100 and perform an input/output operation (a read operation or a program operation) corresponding to the non-volatile memory device 210.

The controller 220 may be implemented to perform a Host Performance Booster (HPB) function. The controller 220 may load metadata used for driving from the non-volatile memory device 210. For example, the controller 220 may load all or a portion of the L2P map stored in the non-volatile memory device 210, and store the same in an internal buffer memory (e.g., SRAM, or the like).

In general, a storage device in a host system, for example, UFS, is equipped with a Host Performance Booster (HPB) function. HPB is a technique for caching L2P mapping information in the host, and is used to improve read performance. In general, in the device control mode of HPB, in a case in which a large number of map misses occur due to input/output requests generated by the host, the storage device loads related map information. This may cause loading of map information that is meaningless for ranges that are no longer needed by the real host.

On the other hand, the host system 10 according to an example embodiment may monitor files to be used by the host device 100, and may load an L2P map according to the monitoring result into the host buffer memory 120 in advance, thereby improving overall read performance. In an example embodiment, the host system 10 pre-fetches the L2P map according to a working file set suitable for a specific context, so that a fast read operation for files used in a specific situation may be performed. For example, when pre-fetching the host buffer memory 120 by requesting the storage device 200 for map information corresponding to the working file set, a fast read operation may be performed on image files to be used again.

Figure 2:
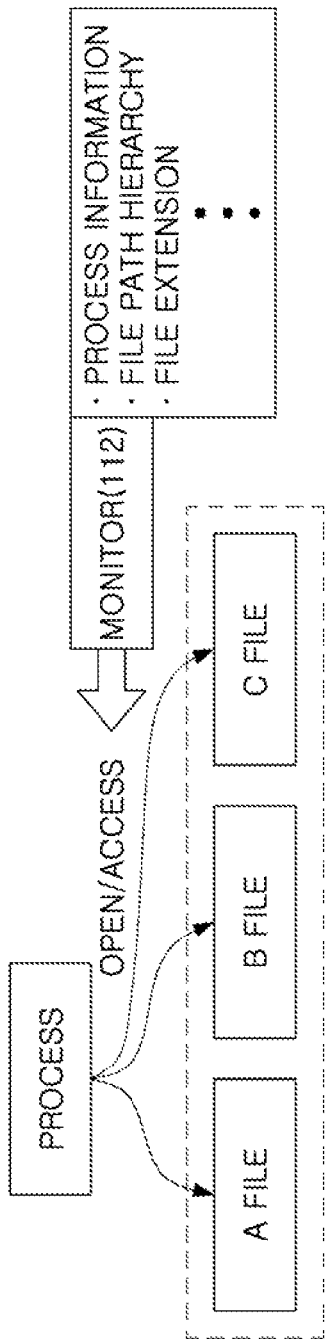
FIG. 2 is a diagram illustrating, by way of example, a process of securing a working file set in a context monitor 112 according to an example embodiment.

FIG. 2 is a diagram illustrating, by way of example, a process of securing a working file set in the context monitor 112 according to an example embodiment.

The context may be defined as a specific context by collecting process execution information and file open information. Each context may be a key value for a working file set. The context monitor 112 (refer to FIG. 1) may monitor file open information in a specific situation, for example, a file path structure, file extension information, and process information. In this case, the specific situation may be identified by monitoring a series of command processing performed by the process. In an example embodiment, each specific situation may exist independently according to a process. The context monitor 112 may detect a working file set of the host device 100 in a specific situation by detecting the generated process and file open event.

Referring to FIG. 2, a working file set may be created through file open and process information. In this case, the working file set is a combination of process information, directory information, or file extension information, and an accessed Logical Block Address (LBA). The working file set may be configured for each context.

The working file set configured according to the monitoring result may be stored in a database inside the host device 100 (refer to FIG. 1) in a host-accessible form.

Figure 3:
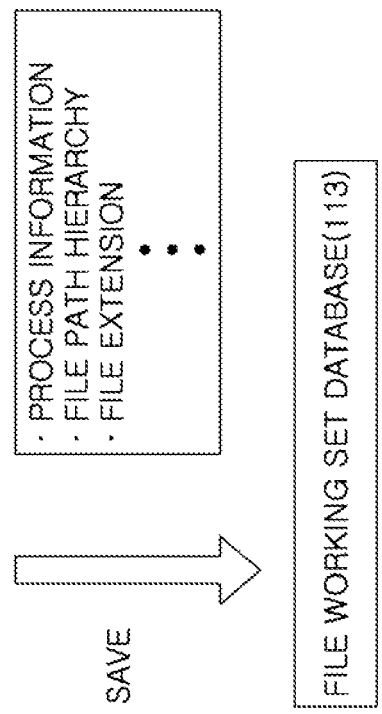
FIG. 3 is a diagram illustrating, by way of example, a process of storing the working file set secured in FIG. 2 in a database.

FIG. 3 is a diagram illustrating, by way of example, a process of storing the working file set secured in FIG. 2 in a database.

Referring to FIG. 3, the working file set identified for each specific situation may be stored in the database in a form that may be accessed again from the inside of the host device 100.

Figure 4:
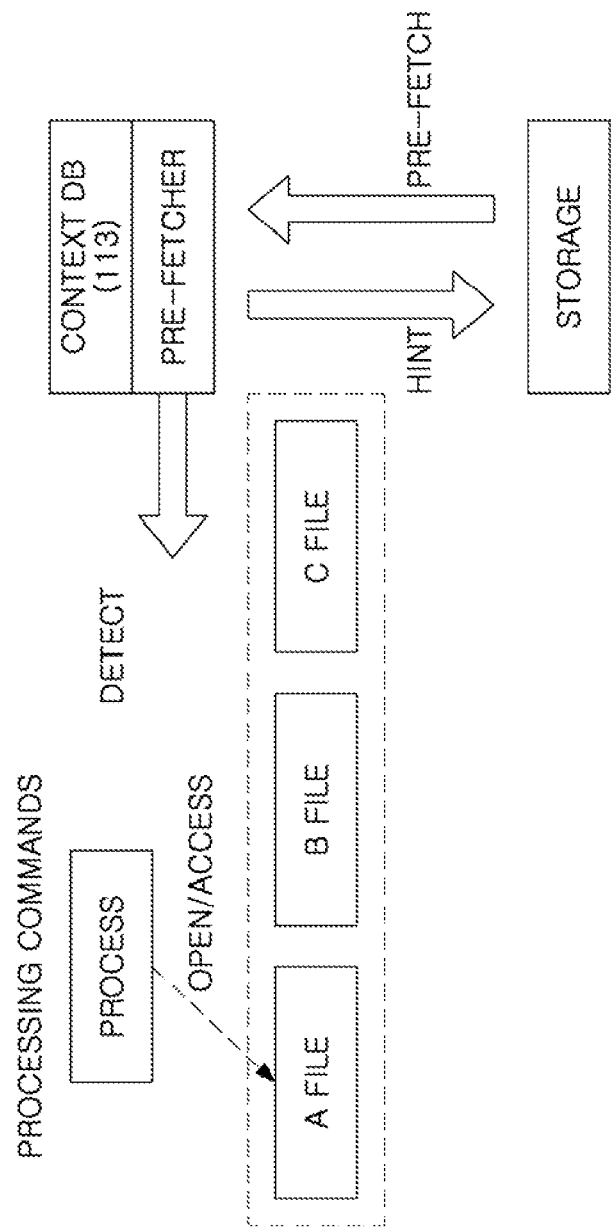
FIG. 4 is a drawing illustrating a process of recognizing a specific situation, transmitting a map hint suitable for the specific situation, and performing pre-fetching with a device driver 111 of a host device 100 according to an example embodiment.

FIG. 4 is a drawing illustrating, by way of example, a process of recognizing a specific situation, transmitting a map hint suitable for the specific situation, and performing pre-fetching with the device driver 111 of the host device 100 according to an example embodiment.

Referring to FIG. 4, the device driver 111 may collect file open information to determine a specific situation for a specific process. For example, the context monitor 112 may monitor the command sequence of the process in real time. At this time, when a specific situation is detected, the context monitor 112 may check whether the working file set is configured. When the working file set information is already stored in the database, the device driver 111 may request map information for these files from the storage device 200. Thereafter, the host buffer memory 120 may pre-fetch the corresponding map information transmitted from the storage device 200. On the other hand, when the working file set information is not present in the database, the context monitor 112 configures new working file set information using process information, file information, and extension information, and stores the configured working file set information in the database. Thereafter, the device driver 111 may request corresponding map information from the storage device 200. The host buffer memory 120 may store map information pre-fetched from the storage device 200. Accordingly, the host system 10 according to an example embodiment may perform a fast read operation on files (e.g., a working file set) used in a specific situation.

Also, when the working file set is defined in advance, the device driver 111 may transmit hint information (e.g., LBA) on the related files to the storage device 200. Accordingly, the storage device may pre-fetch the L2P map corresponding to the hint information to the host device 100. For example, the L2P map corresponding to the working file set may be pre-fetched by the host buffer memory 120 of the host device 100. As such, when a working file set for a specific situation is defined, pre-fetched map information is fetched in advance so that data for corresponding files may be read quickly.

The host system 10 according to an example embodiment uses the working file set information for an action of a specific process executing a series of commands (this is defined as a situation, referred to as a context) in the storage device 200, to cache the map information for the storage device 200, to provide not only read speed improvement but overall system performance improvement.

Figure 5:
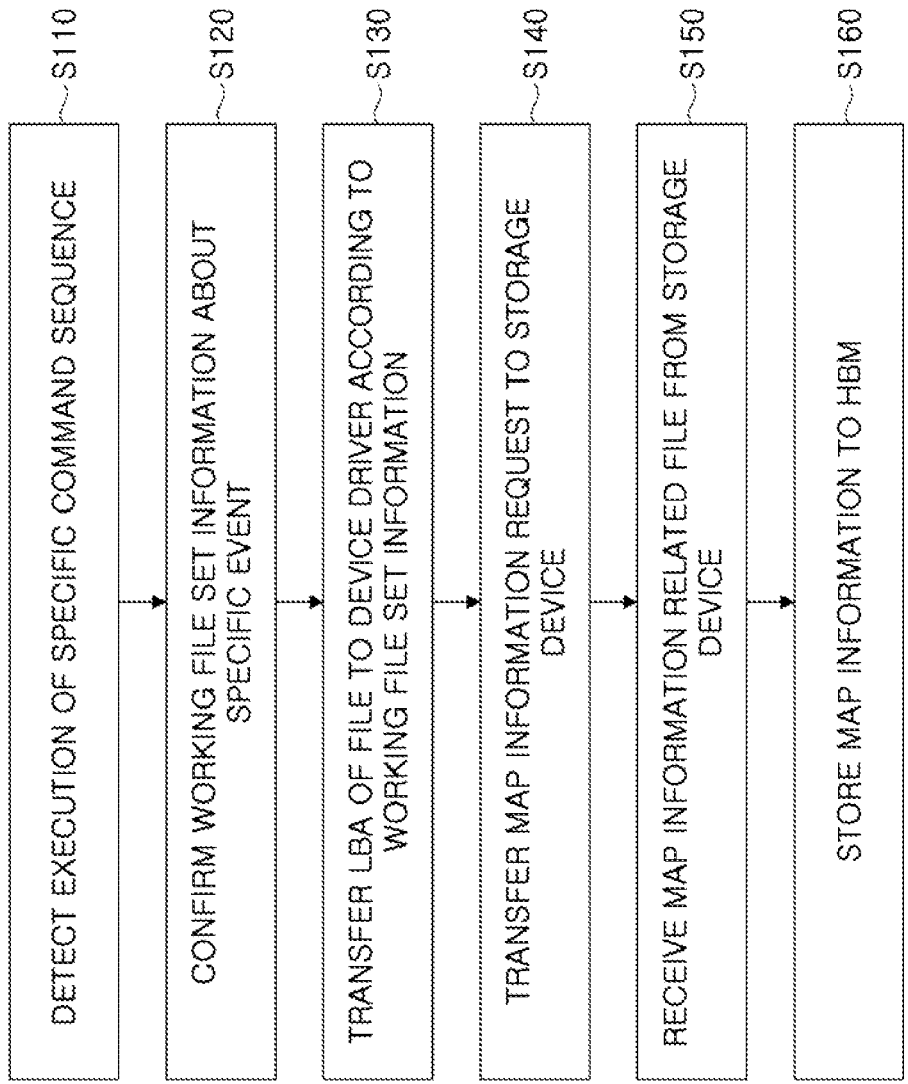
FIG. 5 is a flowchart illustrating, by way of example, a method of operating the device driver 111 of the host device 100 according to an example embodiment.

FIG. 5 is a flowchart illustrating, by way of example, a method of operating the device driver 111 of the host device 100 according to an example embodiment.

Referring to FIGS. 1 to 5, the operation of the device driver 111 of the host device 100 according to an example embodiment may proceed as follows.

The context monitor 112 may detect that a specific process executes a specific command sequence (S110). For example, the context monitor 112 may detect a specific situation. The context monitor 112 may check working file set information for a specific situation in an internal database (S120). The context monitor 112 may transmit a corresponding LBA to the device driver 111 according to the working file set information (S130). The device driver 111 may transmit hint information requesting map information to the storage device 200 (S140). In this case, the hint information may include information for requesting an L2P map range (e.g., HPB region) corresponding to the target LBA information. The storage device 200 may transmit the L2P map to the device driver 111 based on the hint information. The device driver 111 may receive map information related to the working file set from the storage device 200 (S150). The device driver 111 may store the received map information in the host buffer memory 120 (S160).

Figure 6:
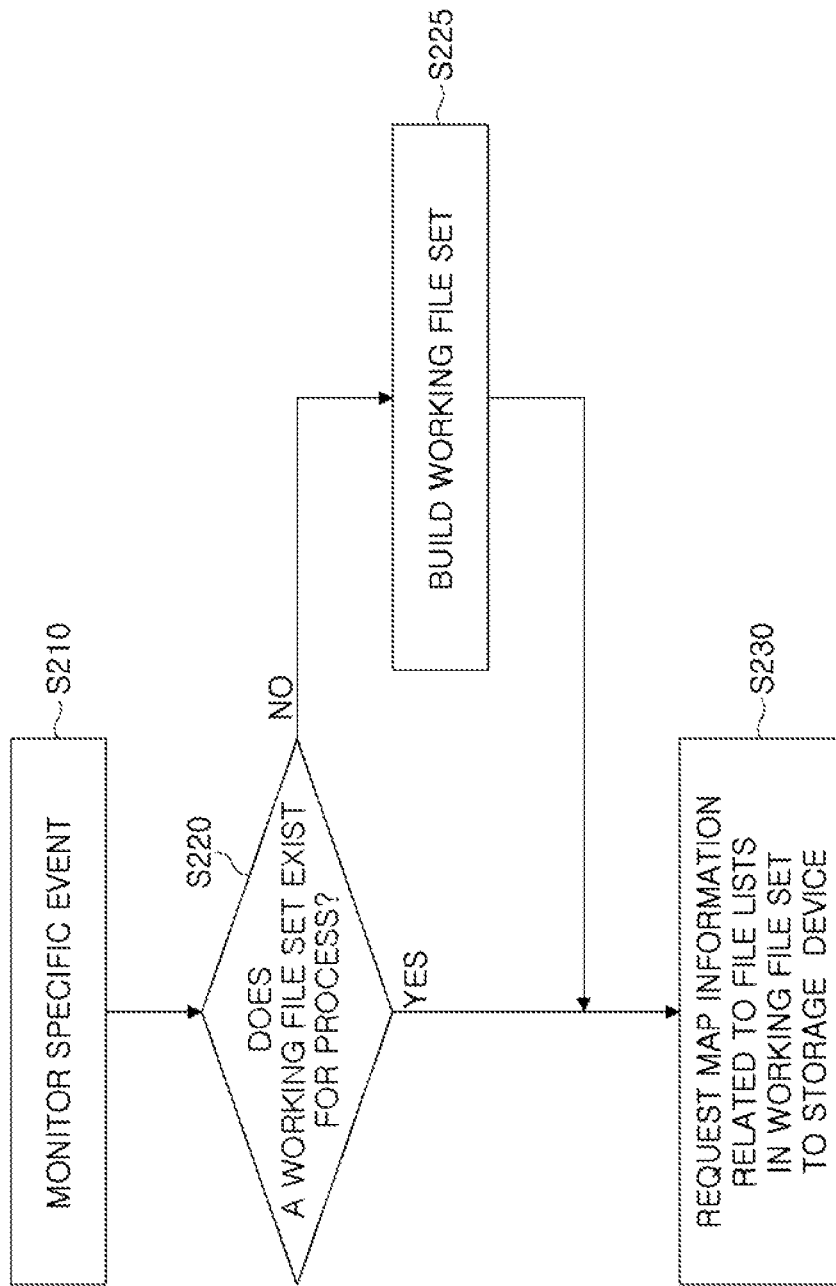
FIG. 6 is a diagram illustrating an operation of managing a working process file set in the device driver 111 of the host device 100 according to an example embodiment.

FIG. 6 is a diagram illustrating an operation of managing a working process file set in the device driver 111 of the host device 100 according to an example embodiment.

Referring to FIGS. 1 to 6, the process of managing the working process file set may be performed as follows.

The device driver 111 may monitor a specific situation according to the process (S210). The device driver 111 may determine whether a working file set for a process corresponding to a specific situation is present in an internal database (S220).

When the working file set corresponding to the specific situation is not present in the internal database of the host device 100, the device driver 111 creates/constructs a new working file set corresponding to the specific situation in the database (S225), and thereafter, operation S230 may be performed. On the other hand, when a working file set corresponding to a specific situation is present in the internal database of the host device 100, the device driver 111 may request map information for file lists present in the working file set from the storage device 200 (S230).

Figure 7:
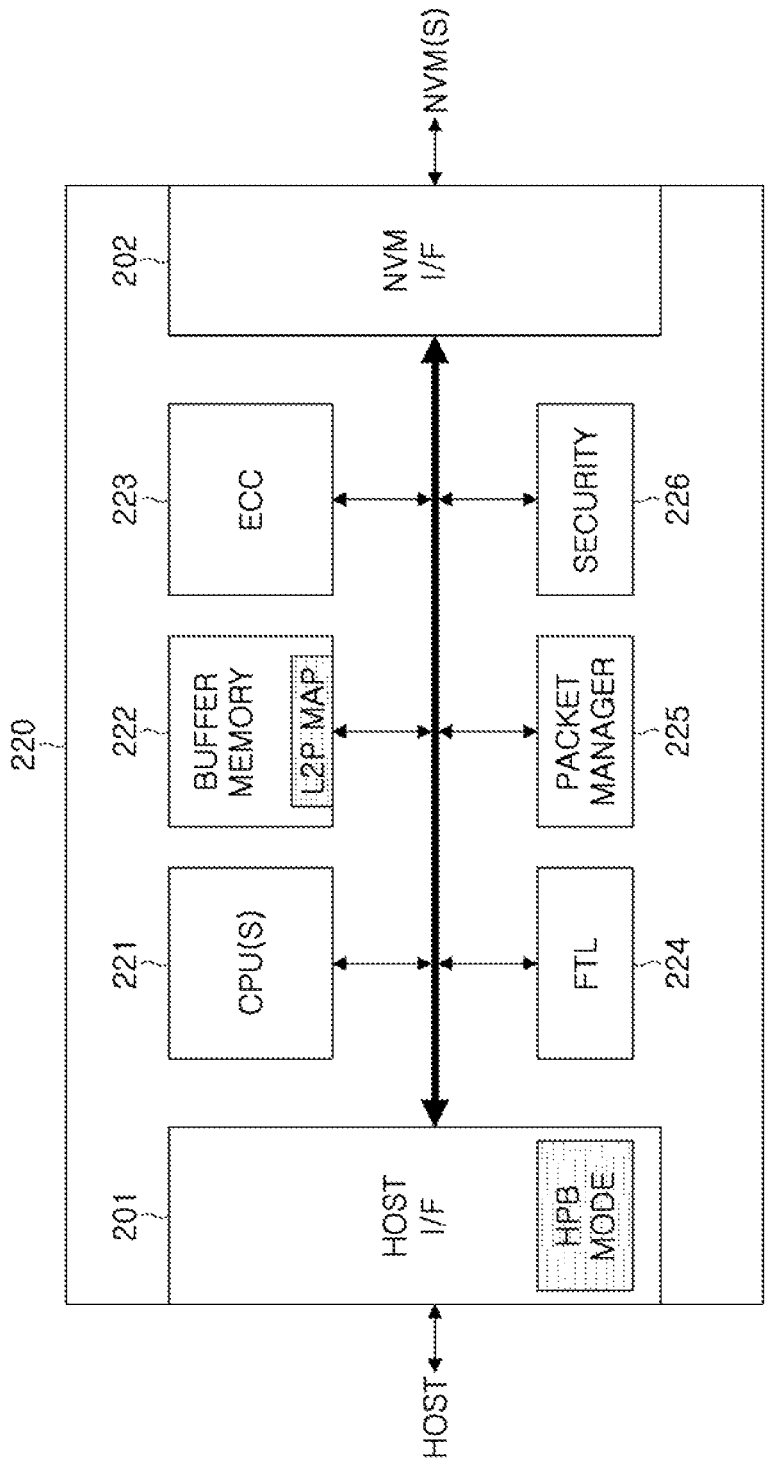
FIG. 7 is a diagram illustrating, by way of example, a controller 220 according to an example embodiment.

FIG. 7 is a diagram illustrating, by way of example, a controller 220 according to an example embodiment.

Referring to FIG. 7, the controller 220 may include a host interface circuit 201, a memory interface circuit 202, at least one processor (CPU(s)) 221, a buffer memory 222, an error correction circuit (ECC) 223, a flash translation layer (FTL) manager 224, a packet manager 225, and an encryption or security device 226.

The host interface circuit 201 may be implemented to transmit and receive packets to and from the host. A packet transmitted from the host to the host interface circuit 201 may include a command or data to be written to the non-volatile memory device 210. A packet transmitted from the host interface circuit 201 to the host may include a response to a command or data read from the non-volatile memory device 210. The host interface circuit 201 may be implemented to support the HPB function.

In an example embodiment, the host interface circuit 201 may be connected to the host device 100 through a Universal Flash Storage (UFS), an embedded Multi Media Card (eMMC), a Serial Advanced Technology Attachment (SATA) bus, a Small Computer Small Interface (SCSI) bus, and a Non-Volatile Memory Express (NVMe) bus, or a Serial Attached SCSI (SAS) bus.

The memory interface circuit 202 may transmit data to be written to the non-volatile memory device 210 to the non-volatile memory device 210 or receive data read from the non-volatile memory device 210. The memory interface circuit 202 may be implemented to comply with standard protocols such as Joint Electron Device Engineering Council (JEDEC) or Open NAND Flash Interface (ONFI).

The flash translation layer manager 224 may perform various functions such as address mapping, wear-leveling, and garbage collection. The address mapping operation is an operation of changing a logical address received from the host into a physical address used to actually store data in the non-volatile memory device 221. Wear-leveling is a technique for preventing excessive degradation of a specific block by ensuring that blocks in the non-volatile memory device 210 are used uniformly, and for example, may be implemented by a firmware technique for balancing erase counts of physical blocks. Garbage collection is a technique for securing usable capacity in the non-volatile memory device 210 by copying valid data of a block to a new block and then erasing the existing block.

The packet manager 225 may generate a packet according to a protocol of an interface negotiated with the host, or parse various types of information from a packet received from the host. The buffer memory 222 may temporarily store data to be written to the non-volatile memory device 210 or data read from the non-volatile memory device 210. In an example embodiment, the buffer memory 222 may be a component provided in the controller 220. In another example embodiment, the buffer memory 222 may be disposed outside the controller 220.

The encryption device 226 may perform at least one of an encryption operation and a decryption operation on data input to the controller 220 using a symmetric-key algorithm. The encryption device 226 may perform encryption and decryption of data using an Advanced Encryption Standard (AES) algorithm. The encryption device 226 may include an encryption module and a decryption module. In an example embodiment, the encryption device 226 may be implemented in hardware/software/firmware.

The encryption device 226 may perform a Self-Encryption Disk (SED) function or a Trusted Computing Group (TCG) security function. The SED function may store encrypted data in the non-volatile memory device 210 using an encryption algorithm or may decrypt data encrypted from the non-volatile memory device 210. This encryption/decryption operation may be performed using an internally generated encryption key. The TCG security function may provide a mechanism that enables access control to user data of the storage device 200. For example, the TCG security function may perform an authentication procedure between the external device and the storage device 200. In an example embodiment, the SED function or the TCG security function is optionally selectable.

Figure 8:
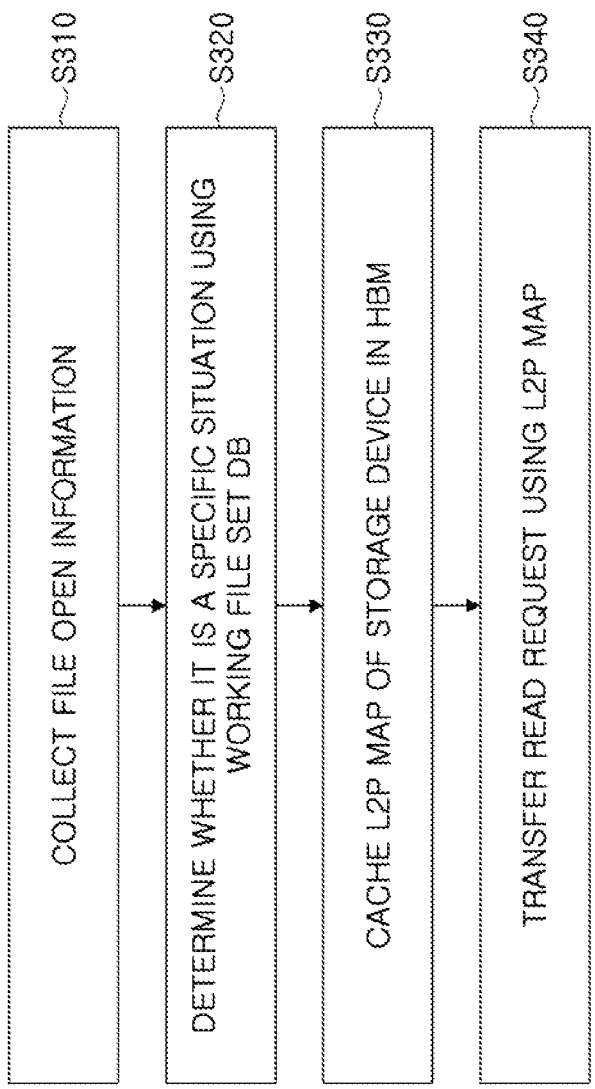
FIG. 8 is a flowchart illustrating, by way of example, a method of operating the host device 100 according to an example embodiment.

FIG. 8 is a flowchart illustrating, by way of example, a method of operating the host device 100 according to an example embodiment.

Referring to FIGS. 1 to 8, the host device 100 may operate as follows.

The host device 100 may collect file open information for improving performance (S310). The host device 100 may determine whether a command sequence of a process is a specific situation by using the working file set database (S320). When the command sequence of the process indicates a specific situation, the host device 100 may cache the L2P map of the storage device 200 corresponding to the specific situation in the host buffer memory 120 (S330). Thereafter, the host device 100 may transmit a read request to the storage device 200 using the L2P map stored in the host buffer memory 120.

In an example embodiment, machine learning may be used to determine whether a command sequence of a process corresponds to a specific situation. Such machine learning may be operated based on at least one of various learning algorithms, such as neural networks, support vector machines (SVMs), linear regression, decision trees, generalized linear models (GLM), random forests, Gradient boosting machine (GBM), Deep learning, Clustering, Anomaly detection, Dimension reduction, and the like.

Figure 9:
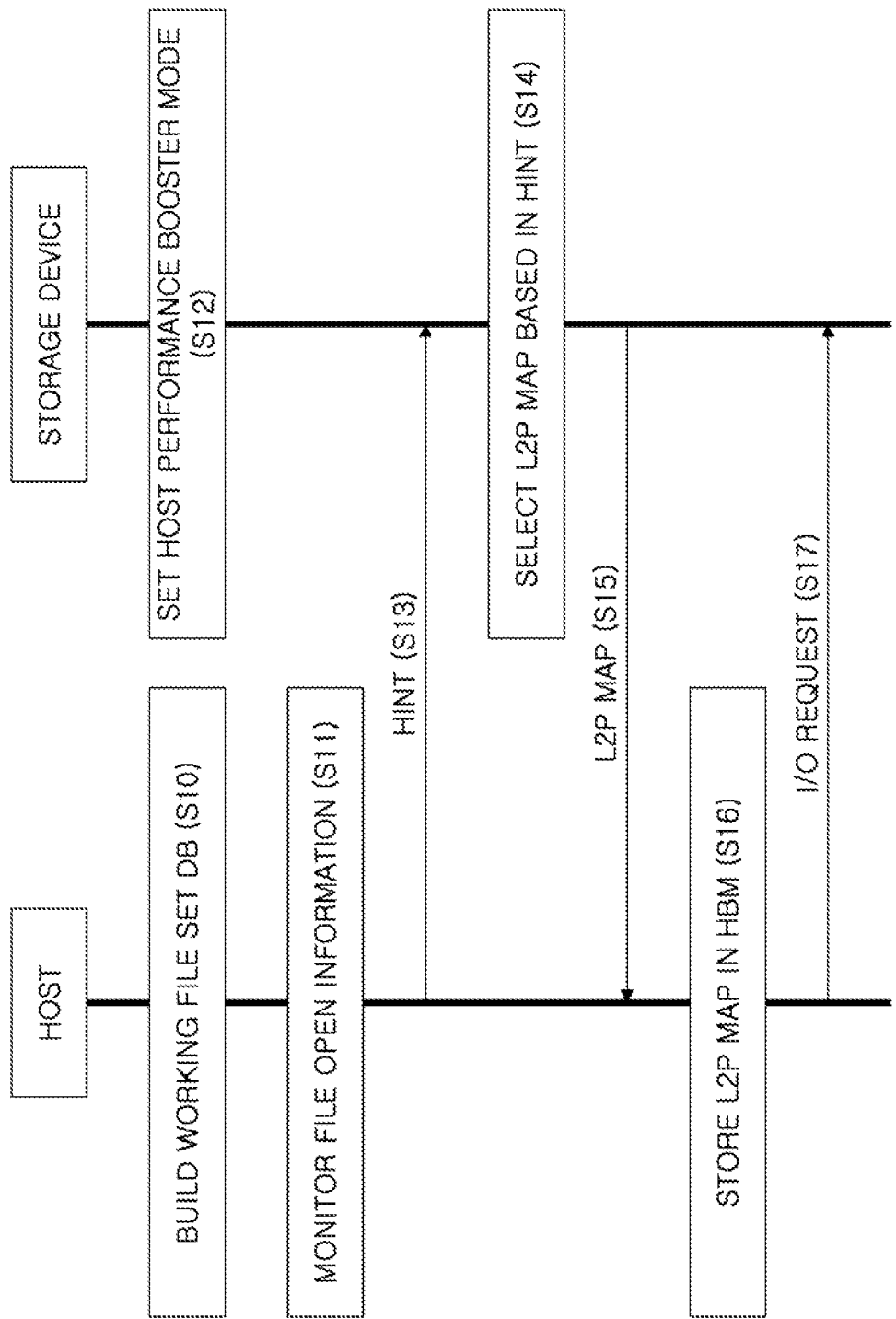
FIG. 9 is a ladder diagram illustrating, by way of example, the operation of the host system 10 according to an example embodiment.

FIG. 9 is a ladder diagram illustrating, by way of example, an operation of the host system 10 according to an example embodiment.

Referring to FIG. 9, the input/output operation of the host system 10 according to an example embodiment may be performed as follows.

The host device may build a working file set database corresponding to a specific situation (S10). The host device may monitor the file open information to determine whether it corresponds to a specific situation (S11). The storage device may set the HPB mode in anticipation of performance improvement in I/O operation (S12).

When the process indicates a specific situation according to the monitoring result of the host device, the host device may transmit hint information to the storage device (S13). In this case, the hint information may include a request for map information related to an LBA included in a working file set corresponding to a specific situation. The storage device may receive the hint information and select L2P map corresponding to the hint information (S14). The storage device may transmit the selected L2P map to the host device (S15). In this case, the L2P map may be encrypted with a key shared with the host device. For example, the encrypted L2P map may be transmitted to the host device.

The host device may receive the L2P map from the storage device and store the received L2P map in the host buffer memory (S16). The host device may transmit an I/O request to the storage device using the L2P map stored in the host buffer memory.

In an example embodiment, various aspects of the above example embodiments may be applied to an electronic device, for example as described below.

Figure 10:
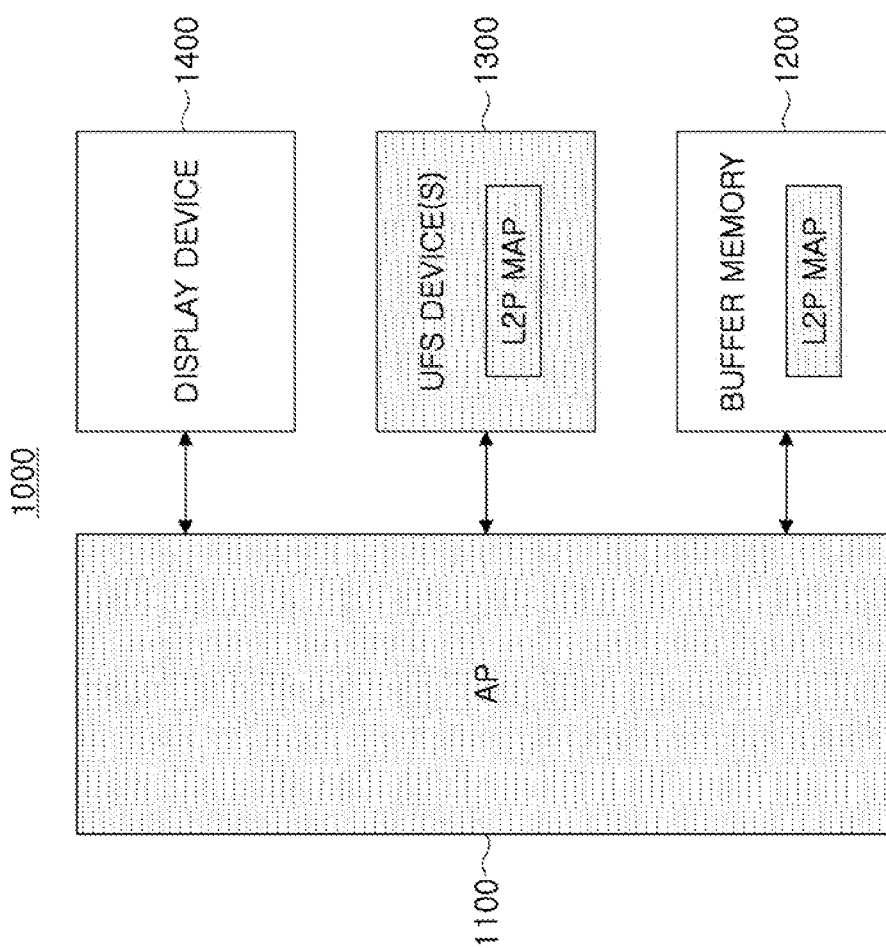
FIG. 10 is a diagram illustrating, by way of example, an electronic device 1000 according to an example embodiment.

FIG. 10 is a diagram illustrating, by way of example, an electronic device 1000 according to an example embodiment.

Referring to FIG. 10, the electronic device 1000 may include an application processor (AP) 1100, a buffer memory 1200, a storage device 1300, and a display device 1400.

The application processor (AP) 1100 may be implemented to execute various software. For example, the application processor 1100 may execute a file system or the device driver described in FIGS. 1 to 9. For example, the application processor 1100 may monitor a process and file access to identify a specific context, predict a read operation in a specific range corresponding to the specific context, and store hint information corresponding to the read operation in the storage device 1300. In this case, a read operation in a specific range may be performed through machine learning.

The buffer memory 1200 may be implemented to temporarily store data used to drive the electronic device 1000. In detail, the buffer memory 1200 may be implemented to store all or part of the L2P map of the storage device 1300 under the control of the application processor 1100.

In an example embodiment, the electronic device 1000 may further include a database for storing a specific context. In this case, the database may be built in the buffer memory 1200. In an example embodiment, when the specific context is not present in the database, the application processor 1100 may build the specific context in the database. In an example embodiment, when the L2P map is incorrect, the application processor 1100 may modify the working file set in the corresponding context.

The storage device 1300 may activate the HPB mode under the control of the application processor 1100, receive hint information according to a specific situation from the application processor 1100 in the HPB mode, and receive a corresponding hint information based on the hint information. L2P map may be loaded into the buffer memory 1200. In an example embodiment, the storage device 1300 may perform a Host Performance Booster (HPB) function in a host control mode.

The display device 1400 may be implemented to display data processed by the application processor 1100. Although not illustrated, the display device 1400 may further include a touch panel that receives input data according to a user's touch operation.

In an example embodiment, various aspects of the above example embodiments may be applied to a UFS system, for example as described below.

Figure 11:
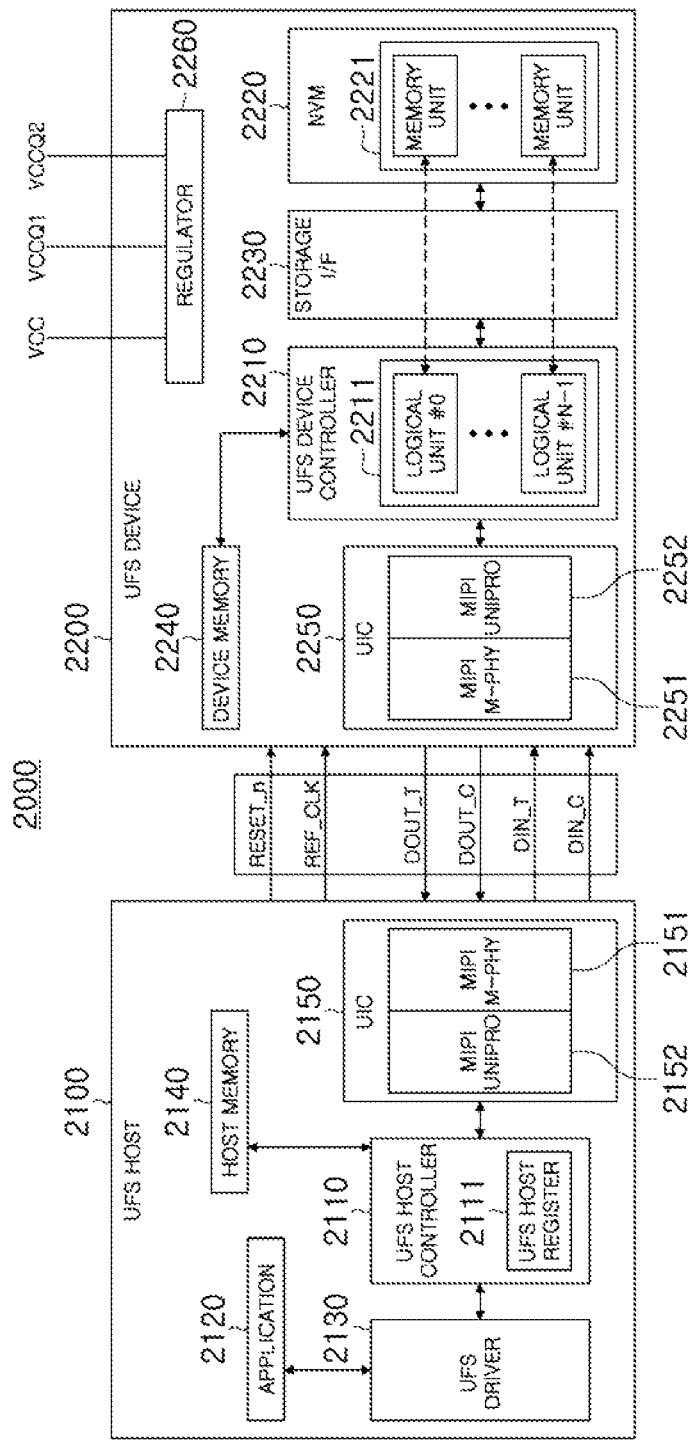
FIG. 11 is a diagram illustrating a UFS system 2000 according to an example embodiment.

FIG. 11 is a diagram illustrating a UFS system 2000 according to an example embodiment.

The UFS system 2000 is a system conforming to the UFS standard announced by the Joint Electron Device Engineering Council (JEDEC), and may include a UFS host 2100, a UFS device 2200, and a UFS interface 2300. The description of the host system 10 illustrated in FIGS. 1 to 10 may also be applied to the UFS system 2000 of FIG. 11.

Referring to FIG. 11, a UFS host 2100 and a UFS device 2200 may be interconnected through a UFS interface 2300.

When the main processor 1100 of FIG. 11 is an application processor, the UFS host 2100 may be implemented as a portion of the corresponding application processor. The UFS host controller 2110 and the host memory 2140 may correspond to the controller 1120 and the memories 1200a and 1200b of the main processor 1100 of FIG. 11, respectively. The UFS device 2200 may correspond to the storage devices 1300a and 1300b of FIG. 11, and the UFS device controller 2210 and the non-volatile memory 2220 may correspond to the storage controllers 1310a and 1310b and the non-volatile memories 1320a and 1320b of FIG. 11, respectively.

The UFS host 2100 may include a UFS host controller 2110, an application 2120, a UFS driver 2130, a host memory 2140, and a UFS interconnect (UIC) layer 2150. The UFS device 2200 may include a UFS device controller 2210, a non-volatile memory 2220, a storage interface 2230, a device memory 2240, a UIC layer 2250, and a regulator 2260. The non-volatile memory 2220 may include a plurality of memory units 2221, and the memory unit 2221 may include a V-NAND flash memory having a 2D structure or a 3D structure, but may also include other types of non-volatile memory such as PRAM and/or RRAM. The UFS device controller 2210 and the non-volatile memory 2220 may be connected to each other through the storage interface 2230. The storage interface 2230 may be implemented to comply with a standard protocol such as toggle or ONFI.

The application 2120 may mean a program that wants to communicate with the UFS device 2200 to use the function of the UFS device 2200. The application 2120 may transmit an input/output request (IOR) to the UFS driver 2130 for input/output to the UFS device 2200. The input/output request (IOR) may mean a read request, a write request, and/or a data discard request, for example.

The UFS driver 2130 may manage the UFS host controller 2110 through a UFS-HCI (host controller interface). The UFS driver 2130 may convert the input/output request generated by the application 2120 into a UFS command defined by the UFS standard, and transmit the converted UFS command to the UFS host controller 2110. One input/output request may be converted into a plurality of UFS commands. A UFS command may be a command defined by the SCSI standard by default, but may also be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. In this process, a UFS host register 2111 of the UFS host controller 2110 may serve as a command queue (CQ).

The UIC layer 2150 on the UFS host 2100 side may include MIPI M-PHY 2151 and MIPI UniPro 2152, and the UIC layer 2250 on the UFS device 2200 side may also include MIPI M-PHY (2251) and MIPI UniPro (2252).

The UFS interface 2300 may include a line for transmitting a reference clock REF_CLK, a line for transmitting a hardware reset signal RESET_n for the UFS device 2200, a pair of lines for transmitting a differential input signal pair DIN_t and DIN_c, and a pair of lines for transmitting the differential output signal pair (DOUT_t and DOUT_c).

The frequency value of the reference clock REF_CLK provided from the UFS host 2100 to the UFS device 2200 may be one of four values of 19.2 MHz, 26 MHz, 38.4 MHz, and 52 MHz, example. The UFS host 2100 may change the frequency value of the reference clock REF_CLK during operation, for example, while data transmission/reception is performed between the UFS host 2100 and the UFS device 2200. The UFS device 2200 may generate clocks of various frequencies from the reference clock REF_CLK provided from the UFS host 2100 using a phase-locked loop (PLL) or the like. Also, the UFS host 2100 may set a data rate value between the UFS host 2100 and the UFS device 2200 through the frequency value of the reference clock REF_CLK. For example, the value of the data rate may be determined depending on the frequency value of the reference clock REF_CLK.

The UFS interface 2300 may support multiple lanes, and each lane may be implemented as a differential line pair. For example, the UFS interface 2300 may include one or more receive lanes and one or more transmit lanes. In FIG. 11, a pair of lines transmitting the differential input signal pair (DIN_T and DIN_C) may constitute a receive lane, and a pair of lines transmitting the differential output signal pair (DOUT_T and DOUT_C) may constitute a transmit lane, respectively. FIG. 11 illustrates one transmit lane and one receive lane, but the number of transmit lanes and receive lanes may be changed.

The receive lane and the transmit lane may transmit data in a serial communication method, and the full-duplex communication between the UFS host 2100 and the UFS device 2200 may be performed by a structure in which the receive and transmit lanes are separated. For example, the UFS device 2200 may transmit data to the UFS host 2100 through the transmit lane while receiving data from the UFS host 2100 through the receive lane. In addition, control data such as commands from the UFS host 2100 to the UFS device 2200, and user data to be stored in the non-volatile memory 2220 by the UFS host 2100 or to be read from the non-volatile memory 2220 may be transmitted through the same lane. Accordingly, there is no need to provide a separate lane for data transmission between the UFS host 2100 and the UFS device 2200 in addition to the pair of receive lanes and the pair of transmit lanes.

The UFS device controller 2210 of the UFS device 2200 may control overall operation of the UFS device 2200. The UFS device controller 2210 may manage the non-volatile memory 2220 through a logical unit (LU) 2211 which is a logical data storage unit. The number of LUs 2211 may be 8, but is not limited thereto. The UFS device controller 2210 may include a flash translation layer (FTL), and may convert a logical data address transmitted from the UFS host 2100, for example, a logical block address (LBA), into a physical data address, for example, a physical block address (PBA), using the address mapping information of the FTL. A logical block for storing user data in the UFS system 2000 may have a size within a predetermined range. For example, a minimum size of the logical block may be set to 4 Kbytes, although the size of the logical block may be varied.

When a command from the UFS host 2100 is input to the UFS device 2200 through the UIC layer 2250, the UFS device controller 2210 may perform an operation according to the input command, and when the operation is completed, the UFS device controller 2210 may transmit a completion response to the UFS host 2100.

In an example embodiment, when the UFS host 2100 intends to store user data in the UFS device 2200, the UFS host 2100 may transmit a data storage command to the UFS device 2200. When a response indicating that the user data is ready-to-transfer is received from the UFS device 2200, the UFS host 2100 may transmit the user data to the UFS device 2200. The UFS device controller 2210 may temporarily store the received user data in the device memory 2240 and may store the user data temporarily stored in the device memory 2240, in a selected location of the non-volatile memory 2220, based on the address mapping information of the FTL.

In an example embodiment, when the UFS host 2100 wants to read user data stored in the UFS device 2200, the UFS host 2100 may transmit a data read command to the UFS device 2200. Upon receiving the command, the UFS device controller 2210 may read user data from the non-volatile memory 2220 based on the data read command, and temporarily store the read user data in the device memory 2240. In this reading process, the UFS device controller 2210 may detect and correct errors in the read user data using a built-in error correction code (ECC) engine.

In detail, the ECC engine may generate parity bits for write data to be written to the non-volatile memory 2220, and the generated parity bits may be stored in the non-volatile memory 2220 together with the write data. When reading data from the non-volatile memory 2220, the ECC engine may use parity bits read from the non-volatile memory 2220 together with the read data to correct an error in the read data and output the error-corrected read data.

Also, the UFS device controller 2210 may transmit user data temporarily stored in the device memory 2240 to the UFS host 2100. In addition, the UFS device controller 2210 may further include an advanced encryption standard (AES) engine. The AES engine may perform at least one of an encryption operation and a decryption operation on data input to the UFS device controller 2210 using a symmetric-key algorithm.

The UFS host 2100 may sequentially store commands to be transmitted to the UFS device 2200 in the UFS host register 2111, which may function as a command queue, and may sequentially transmit the commands to the UFS device 2200. At this time, even if the previously transmitted command is still being processed by the UFS device 2200, for example, even before receiving a notification that the previously transmitted command has been processed by the UFS device 2200, the UFS host 2100 may transmit the next command waiting in the command queue to the UFS device 2200. Accordingly, the UFS device 2200 may also receive the next command from the UFS host 2100 while processing the previously transmitted command. A maximum number of commands that may be stored in such a command queue (queue depth) may be, for example, 32. Also, the command queue may be implemented as a circular queue type that indicates the start and end of a command string stored in the queue through a head pointer and a tail pointer, respectively.

Each of the plurality of memory units 2221 may include a memory cell array and a control circuit for controlling operations of the memory cell array. The memory cell array may include a two-dimensional memory cell array or a three-dimensional memory cell array. The memory cell array may include a plurality of memory cells. Each memory cell may be a cell (single level cell, SLC) that stores 1-bit information, but may also be a cell storing information of 2 or more bits, such as a multilevel cell (MLC), a triple level cell (TLC), or a quadruple level cell (QLC). The three-dimensional memory cell array may include vertical NAND strings that are vertically oriented such that at least one memory cell is positioned on another memory cell.

The UFS device 2200 may receive VCC, VCCQ, VCCQ2, and the like as a power supply voltage. VCC is a main power voltage for the UFS device 2200 and may have a value of 2.4 V to 3.6 V. VCCQ is a power supply voltage for supplying a low-range voltage, mainly for the UFS device controller 2210, and may have a value of 1.14 V to 1.26 V. VCCQ2 is a power supply voltage for supplying a voltage lower than VCC but higher than VCCQ, mainly for an input/output interface such as the MIPI M-PHY 2251, and may have a value of 1.7 V to 1.95 V. The power voltages may be supplied for each component of the UFS device 2200 through the regulator 2260. The regulator 2260 may be implemented as a set of unit regulators respectively connected to different ones of the above-described power voltages.

A host system and an operating method thereof according to an example embodiment may improve overall system speed by fetching mapping information in units of a specific situation (or context) and improving the read speed of related working file sets.

In an example embodiment, a working file set used in a corresponding process may be configured by recognizing a specific situation through a command sequence of a process, and the working file set may be stored in a database. Thereafter, when a specific situation occurs, the host device may request L2P mapping information of the storage device for the corresponding working file set. In this case, the file may be used as a factor to understand the situation. In an example embodiment, in a specific situation, mapping information for a working file set may be fetched in advance, and a read speed thereof may be improved. In an example embodiment, the mapping information of the working file set for each specific situation may be obtained in advance from the storage device.

The electronic device according to an example embodiment may accelerate the read command by caching the L2P mapping used inside the storage device in the host.

The method of operating an electronic device according to an example embodiment may collect command execution information and file access information of a process from a host in real time and define the same as a specific context. In an example embodiment, the operating method of the electronic device may define information about a file and an LBA accessed from a divided context as a working file set, and manage the same in association with the context. In an example embodiment, when a specific context is detected by the host, the method of operating the electronic device may request desired L2P map from the storage device based on working file set information of the corresponding context. In an example embodiment, when the prediction of the requested L2P map is inaccurate, in the method of operating the electronic device, the working file set may be modified in the corresponding context and may be managed.

As set forth above, methods of operating a host device and a storage device, and an electronic device, according to example embodiments monitor a context according to a specific situation, and pre-caching map information according to the monitoring result from the storage device to a host buffer memory, to improve read performance.

In addition, methods of operating a host device and a storage device, and an electronic device, according to an example embodiment, pre-fetch map information according to a specific situation, to improve overall system performance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a host device, comprising:
   monitoring execution of a command sequence corresponding to a specific situation;
   determining whether working file set information for the command sequence is present in a database;
   transferring a logical address corresponding to the working file set information to a device driver driving a storage device when the working file set information is present in the database;
   requesting map information corresponding to the logical address from the storage device;
   receiving the map information from the storage device; and
   storing the map information in a buffer memory, wherein:
   the map information stored in the buffer memory is used when a read request corresponding to the working file set information is requested, and
   the read request includes a read command, a logical address, and a physical address.

2. The method as claimed in claim 1, wherein the monitoring of the execution of the command sequence includes:
   collecting process performance information and file open information.

3. The method as claimed in claim 1, wherein the working file set information includes:
   process information, directory information, file extension information, or an accessed logical block address.

4. The method as claimed in claim 1, further comprising configuring new working file set information when the working file set information is not present in the database.

5. The method as claimed in claim 4, further comprising storing the new working file set information in an accessible form in the database.

6. The method as claimed in claim 1, wherein the determining of whether the working file set information for the command sequence is present in the database includes:
   extracting the logical address corresponding to the working file set information by machine learning of the working file set information.

7. The method as claimed in claim 1, wherein:
   the map information includes Logical-to-Physical (L2P) map information, and
   the storage device is a Universal Flash Storage (UFS) device.

8. The method as claimed in claim 1, wherein the working file set information is configured based on file and logical address information accessed in a specific context by defining the specific context by collecting command execution information and file access information of a process in real time.

9. The method as claimed in claim 8, further comprising modifying the working file set information of a corresponding context when a prediction of the map information is incorrect.

10. The method as claimed in claim 1, wherein the specific situation includes an opening or accessing of a specific file by a specific process.

11. A method of operating a storage device, comprising:
   setting a host performance booster (HPB) mode;
   receiving, from a host device, hint information including a request for Logical-to-Physical (L2P) map information related to a working file set information corresponding to a command sequence executed in the host device in the HPB mode;
   selecting the L2P map information based on the hint information;
   transmitting the selected L2P map information to the host device; and
   receiving a read request from the host device, the read request including a read command, a logical address, and a physical address corresponding to the selected L2P map information.

12. The method as claimed in claim 11, further comprising setting the storage device to a host control mode.

13. The method as claimed in claim 11, further comprising loading map information from a non-volatile memory device.

14. The method as claimed in claim 11, further comprising performing a read operation on a non-volatile memory device of the storage device by using the physical address included in the read request.

15. The method as claimed in claim 11, wherein the storage device is a Universal Flash Storage (UFS) device.

16. An electronic device, comprising:
- an application processor configured to monitor a process and a file access to identify a specific context, predict a read operation in a specific range corresponding to the specific context, and output hint information corresponding to the read operation;
- a storage device caching Logical-to-Physical (L2P) map information to the application processor, based on the hint information; and
- a buffer memory configured to store the L2P map information by the application processor, wherein the application processor transmits a read request to the storage device, using the L2P map information stored in the buffer memory.

17. The electronic device as claimed in claim 16, wherein the storage device performs a Host Performance Booster (HPB) function in a host control mode.

18. The electronic device as claimed in claim 16, further comprising a database storing the specific context.

19. The electronic device as claimed in claim 18, wherein, when the specific context is not present in the database, the application processor builds the specific context in the database.

20. The electronic device as claimed in claim 16, wherein, when the L2P map information is incorrect, the application processor modifies a working file set information in a corresponding context.

* * * * *